Aug. 19, 1952  J. H. F. STEWART  2,607,080
MOLD FOR PRODUCING PLASTIC ARTICLES WITHOUT FLASH
Filed March 15, 1947

*INVENTOR.*
JOHN H.F. STEWART
BY Ralph L. Tweedale
ATTORNEY

Patented Aug. 19, 1952

2,607,080

UNITED STATES PATENT OFFICE 2,607,080

MOLD FOR PRODUCING PLASTIC ARTICLES WITHOUT FLASH

John H. F. Stewart, Mount Clemens, Mich.

Application March 15, 1947, Serial No. 734,891

7 Claims. (Cl. 18—42)

This invention relates generally to molds and in particular to flash type molds such as are used for molding products of rubber or other plastic materials.

In the past, when the sections of the mold were brought together by the press, the excess material was squeezed out of the mold at the parting lines and remained attached to the molded piece, the latter material being known as flash. In the past, molds, particularly of the multiple cavity type, have created excessive flash. This was due to the fact that when the two sections were brought together even slight tolerances permitted between adjoining molds prevented the complete closing of all of the molds. In addition, even in molds of the single cavity type when the mating parts were closed, construction of the parting line surfaces of the mold permitted flash.

Flash on the molded piece results in increased and unnecessary trimming and finished costs and if one is molding to close dimensions results in scrap pieces. Although flash at the parting line may be removed by tumbling processes, buffing, sanding, etc., the increased labor cost is objectionable.

This invention is based on the principle that the various mold parts may be brought into intimate contact during the molding process by resiliently mounting certain of the mold parts. By properly designing the parting surfaces of this mold, this contact may be made to occur adjacent to the molded part in such a way that flash is eliminated. It is therefore an object of this invention to provide a mold of the type described which will eliminate flash.

Further objects and advantages of the present invention will be apparent from the following description, reference being had to the accompanying drawing wherein a preferred form of the present invention is clearly shown.

Figure 1:
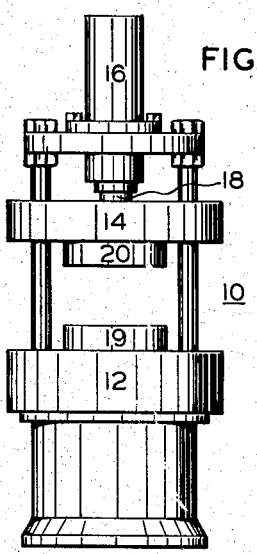
Figure 1 is a simple diagrammatic view of a molding press.

Referring now to Figure 1, there is shown a molding press 10 of simple construction provided with a stationary platen 12 and an upper platen 14 movable towards and away from the platen 12 by means of a conventional fluid cylinder and piston motor 16 having a piston rod 18 rigidly connected to the platen 14. Stationarily mounted on the lower platen 12 is the lower half of a multiple cavity mold indicated generally by the numeral 19. The other section of the multiple cavity mold indicated generally by the numeral 20, is mounted on the platen 14 for movement towards and away from the mold section 19. Both the lower section 19 and the upper section 20 are comprised of die plates 22 within which are mounted the elements shown in Figures 4 to 7 inclusive. These elements are suitably mounted in identical stepped bores, the walls of which are indicated generally by the numerals 24, 26, 28, and 30.

Figure 4:
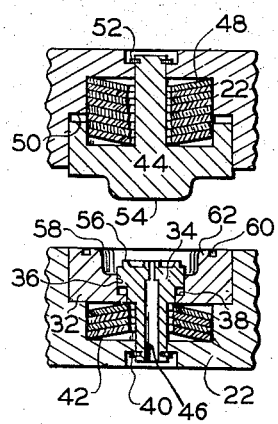
Figure 4 is a partial sectional view of a preferred form of the present invention showing the mold in open position.

Referring now to Figure 4 there is shown stationarily mounted in one of the bores 24 of one of the plates 22 a mold cavity member 32. The main portion of a core 34 is shiftably mounted within a bore 36 of the mold cavity member 32, the downward movement of which is limited by a shoulder 38 of the cavity member 32 and its upward movement by a snap ring 40. The core 34 is biased to a fully upwardly extending position by means of Belleville springs 42. When the sections 19 and 20 are brought together by the press 10, a plunger 44, the main portion of which is shiftably mounted in the bore 24 of the upper plate 22, is adapted to shift the core 34 to its fully downwardly extended position. A passage 46 is provided in the core 34 for excessive material squeezed out of the cavity. The plunger 44 is biased to a fully downwardly extended position by means of Belleville springs 48 of substantially greater resistance than the spring 42. The upward movement of the plunger 44 is limited by a shoulder 50 while its downward movement is limited by a snap ring 52. The plunger 44 is provided with a projecting portion 54 which is adapted upon the sections 20 and 19 being brought together to cooperate as a mating surface with the cavity member 32 and the core 34 in forming the contour of the article to be molded.

The core 34 is provided with a circular land 56 which is adapted to be first engaged by the portion 54 of the plunger 44 when the sections 19 and 20 are brought together. The land 56 has a comparatively small surface area and in cooperation with portion 54 of the plunger 44 is adapted to form the inner periphery of the article to be molded.

The upper portion of the bore 36 of the mold cavity member 32 is enlarged and slightly flared upwardly and outwardly at a point indicated generally by the numeral 58. By providing a groove 60 in the mold cavity member 32 adjacent the flare 58, a land 62 is formed which is adapted to abut plunger 44 adjacent the portion 54 when the sections 19 and 20 are brought together. The land 62 is also of comparatively small area so that the land 56 and the land 62 provide ideal parting surfaces. Preferably, the best results are obtained by lapping the mating parts of the mold.

Figure 5:
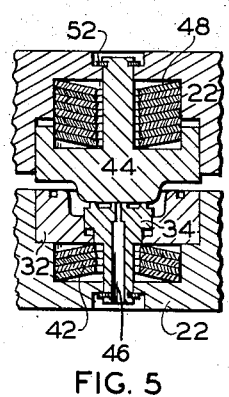
Figure 5 is a view corresponding to that of Figure 4, but showing the mold partially closed.

Referring now to Figure 4, with the platen 14 retracted, the position of the various elements in the two sections of the mold will be as shown. If the motor 16 is operated to lower the platen 14, the section 20 of the mold will be lowered toward the section 19 and the first contact of the two sections of the mold will be as shown in Figure 5. The land 56 of the core 34 will engage the portion 54 of the plunger 44 and will be held in tight engagement thereagainst by means of the springs 42 resisting the movement of the plunger 44.

It should be noted that although other resilient means may be used, the invention in its preferred form makes use of Belleville springs because the axial dimension thereof is very short in relation to the annular diameter of the spring. Consequently, the springs 42 and 48 are adapted to cooperate with the small area of the land 56 and the land 62 for creating a high unit pressure on the lands for holding them tightly in engagement with the plunger 44 and the projecting portion 54 of the plunger 44.

Figure 6:
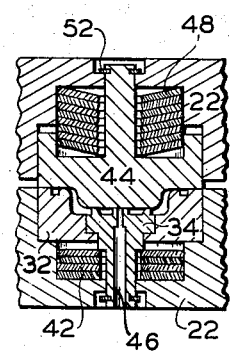
Figure 6 is a view corresponding to that of Figures 4 and 5, but showing the mold sections more fully closed.

Referring now to Figure 6, as the section 20 continues to move toward the section 19, the core 34 will be shifted downwardly due to the fact that the Belleville springs in the upper section have a substantially greater resistance than the Belleville springs in the lower section. The land 62 is shown to have now contacted a portion of the plunger 44 adjacent to the portion 54. Further downward movement of the core 34 will be prevented by the shoulder 38. The springs 42 continue to hold the land 56 in tight engagement with the portion 54 of the plunger 44.

Figure 7:
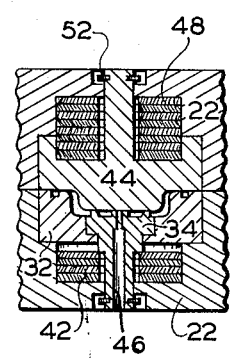
Figure 7 is a view corresponding to that of Figures 4, 5, and 6 but showing the mold completely closed.
Figure 8:
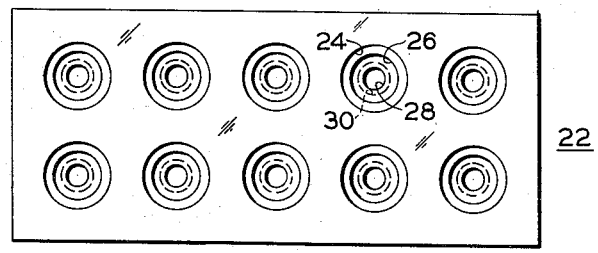
Figure 8 is a bottom view of a multiple cavity die plate.

Referring now to Figure 7, as the section 20 continues to close upon section 19, the upper springs will be compressed to create force holding the plunger 44 in tight engagement against the land 62. As the two sections are moved together in closing relationship, the plunger 44 is shifted upwardly and finally comes to rest in abutment against the shoulder 50.

Figure 2:
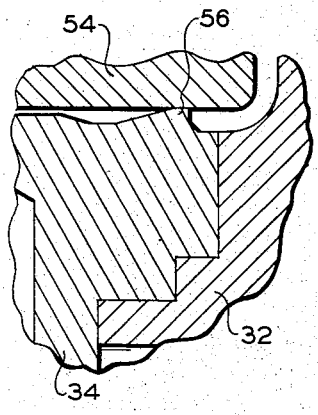
Figure 2 is a partial sectional view of a preferred form of the present invention showing the seating of some of the mating parts of the mold.
Figure 3:
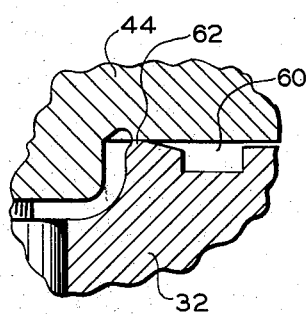
Figure 3 is a partial sectional view of a preferred form of the present invention showing the seating of other mating parts of the mold.

Referring to Figures 2 and 3, the land 56 of the core 34 is shown in abutment against the portion 54 of the plunger 44 and the land 62 is shown held in tight engagement against the surface of the plunger 44 adjacent to the portion 54 thereof.

It should be noted that the parting surfaces are on two different planes, that the lands have a very small contact area, and that the springs, acting in cooperation with the lands, will prevent formation of flash at the parting lines. The area of the parting surface lands and the spring construction should be such that at least a unit pressure of 20,000 p. s. i. will be created at the parting surfaces for eliminating flash. One adaptation of the invention has made use of a unit pressure of 50,000 p. s. i. with very favorable results.

It should also be noted that flash will be prevented on each article molded no matter how great the number of individual molds placed in the plate 22, each individual mold section being adapted to cooperate with its other section, and all mating parts will fully close.

While the form of embodiment of the invention as herein disclosed constitutes a preferred form, it is to be understood that other forms might be adopted, all coming within the scope of the claims which follow.

What is claimed is as follows:

1. A flash type mold comprising two mold halves shaped to form a molding cavity having inner and outer peripheries when placed in juxtaposition, the first half comprising two relatively movable elements, one of said elements carrying an inner parting surface adjacent the inner periphery of the mold cavity and the other element carrying an outer parting surface adjacent the outer periphery of the mold cavity, yieldable means normally displacing one element into the cavity to contact the other mold half independently and ahead of the other element, the second mold half carrying both inner and outer parting surfaces in fixed relation to each other, and means forming a yieldable mounting for the second mold half arranged to cause the mold when closing to first close tightly at one parting surface and subsequently close tightly at the other parting surface, the area of the parting surfaces and the normal force exerted by the yieldable means being correlated to provide unit pressure at the parting surface in excess of the film strength of the material to be molded when in a fluent state whereby a molded piece is formed without appreciable flash at the parting surfaces.

2. A flash type mold comprising two mold halves shaped to form a molding cavity having inner and outer peripheries when placed in juxtaposition, the first half comprising two relatively movable elements, one of said elements carrying an inner parting surface adjacent the inner periphery of the mold cavity and the other element carrying an outer parting surface adjacent the outer periphery of the mold cavity, yieldable means normally displacing one element into the cavity to contact the other mold half independently and ahead of the other element, the second mold half carrying both inner and outer parting surfaces in fixed relation to each other, means forming a yieldable mounting for the second mold half arranged to cause the mold when closing to first close tightly at one parting surface and subsequently close tightly at the other parting surface, the area of the parting surfaces and the normal force exerted by the yieldable means being correlated to provide unit pressure at the parting surface in excess of the film strength of the material to be molded when in a fluent state whereby a molded piece is formed without appreciable flash at the parting surfaces, and means forming inner and outer cavities adjacent the parting surfaces on the side away from the mold cavity for receiving molding material extruded from the parting surfaces.

3. A flash type mold comprising two mold halves shaped to form a molding cavity having inner and outer peripheries when placed in juxtaposition, the first half comprising two relatively movable elements, one carrying an inner parting surface adjacent the inner periphery of the cavity and the other element carrying an outer parting surface adjacent the outer periphery of the cavity, the second half comprising a single element carrying in fixed relationship an inner parting surface, and an outer parting surface, and two separate yieldable means for urging two of said elements toward closed position to separately hold the mating inner and outer parting surfaces in contact, the area of the parting surfaces and the normal force exerted by the yieldable means being correlated to provide unit pressure at each parting surface in excess of the film strength of the material to be molded when in a fluent state whereby a molded piece is formed without appreciable flash at the parting surfaces.

4. A self-trimming compression mold comprising two mold halves adapted to be opened and closed and formed to provide when closed at least one cavity, at least one-half of the mold being formed of a plurality of relatively movable parts each of which carries a wall of the cavity, a raised shearing edge on each part forming a boundary of the cavity, and spring means for exerting the entire pressing force on one of the cavity-carrying relatively movable parts while the mold is closing, said spring means and the area of the shearing edge on said last named relatively movable part being correlated to produce a unit pressure at the last named shearing edge when the mold is closed which exceeds the film strength of the material to be molded whereby all excess material placed in the cavity will be extruded across the last named shearing edge while the mold is closing to produce a finished article having no appreciable flash.

5. A self-trimming compression mold comprising two mold halves adapted to be opened and closed and formed to provide when closed at least one cavity, at least one half of the mold being formed of a plurality of relatively movable parts each of which carries a wall of the cavity, a raised shearing edge on each part having a very small contact area forming a boundary of the cavity, and spring means for exerting the entire pressing force on one of the cavity-carrying relatively movable parts while the mold is closing, said spring means and the area of the shearing edge on said last named relatively movable part being correlated to produce a unit pressure at the last named shearing edge when the mold is closed which exceeds 20,000 pounds per square inch whereby all excess material placed in the cavity will be extruded across the last named shearing edge while the mold is closing to produce a finished article having no appreciable flash.

6. A self-trimming compression mold comprising two mold halves adapted to be opened and closed and formed to provide when closed a plurality of cavities, at least one half of the mold being formed with a plurality of independently movable parts each carrying one wall of a cavity, a raised shearing edge on each part forming a boundary of the cavity, and individual spring means for each cavity-carrying movable part positioned to exert the entire pressing force on that part while the mold is closing, each spring means and the area of each shearing edge being correlated to produce a unit pressure at the corresponding shearing edge when the mold is closed which exceeds the film strength of the material to be molded whereby all excess material placed in the cavity will be extruded across the shearing edges while the mold is closing to produce a finished article having no appreciable flash.

7. A self-trimming compression mold comprising two mold halves adapted to be opened and closed and formed to provide when closed a plurality of cavities, at least one half of the mold being formed with a plurality of independently movable parts each carrying one wall of a cavity, a raised shearing edge on each part having a very small contact area forming a boundary of the cavity, and individual spring means for each cavity-carrying movable part positioned to exert the entire pressing force on that part while the mold is closing, each spring means and the area of each shearing edge being correlated to produce a unit pressure at the corresponding shearing edge when the mold is closed which exceeds 20,000 pounds per square inch whereby all excess material placed in the cavity will be extruded across the shearing edges while the mold is closing to produce a finished article having no appreciable flash.

JOHN H. F. STEWART.

REFERENCES CITED

The following references are of record in the file of this patent:

UNITED STATES PATENTS

| Number | Name | Date |
|---|---|---|
| 1,811,143 | Lund | June 23, 1931 |
| 1,930,815 | Lund | Oct. 17, 1933 |
| 2,148,079 | Martin, Jr. | Feb. 21, 1939 |
| 2,296,744 | Simmons | Sept. 22, 1942 |
| 2,298,057 | Kelm | Oct. 6, 1942 |
| 2,354,241 | Anderson | July 25, 1944 |
| 2,409,142 | McCoy | Oct. 8, 1946 |
| 2,416,451 | Magnus | Feb. 25, 1947 |
| 2,443,826 | Johnson | June 22, 1948 |